United States Patent [19]

Heitmann

[11] 4,210,933
[45] * Jul. 1, 1980

[54] PROCESS AND APPARATUS FOR DIGITALLY CLAMPING PULSE CODE MODULATED VIDEO SIGNALS

[75] Inventor: Jürgen Heitmann, Seeheim, Fed. Rep. of Germany

[73] Assignee: Robert Bosch GmbH, Stuttgart, Fed. Rep. of Germany

[*] Notice: The portion of the term of this patent subsequent to Nov. 7, 1995, has been disclaimed.

[21] Appl. No.: 929,498

[22] Filed: Jul. 31, 1978

[30] Foreign Application Priority Data

Aug. 19, 1977 [DE] Fed. Rep. of Germany ....... 2737431

[51] Int. Cl.² .......................... H04N 5/18; H04B 1/12
[52] U.S. Cl. .................................... 358/172; 328/165; 178/66.1; 455/99
[58] Field of Search .............................. 358/171–173, 358/13, 34, 141, 138, 282; 325/42, 323, 38 R, 38 A; 178/68; 307/237; 328/165, 187

[56] References Cited

U.S. PATENT DOCUMENTS

| | | | |
|---|---|---|---|
| 3,476,875 | 11/1969 | Davis | 358/171 |
| 4,124,869 | 11/1978 | Heitmann | 358/171 |

Primary Examiner—John C. Martin
Attorney, Agent, or Firm—Quaintance, Murphy & Richardson

[57] ABSTRACT

A process and associated apparatus for digitally clamping pulse code modulated video signals is disclosed, including four separate preferred embodiments. The disclosed process first requires that during each horizontal scanning interval a difference between the binary value of the pulse code modulated video signal and a predetermined nominal binary value be determined. This difference is then arithmetically averaged with at least one similarly determined difference obtained during a prior horizontal scanning interval to obtain a binary correction value. The binary correction value is then added to the binary value of the pulse code modulated video signal which is to be clamped outside the horizontal scanning interval in the active range of a horizontal period.

10 Claims, 4 Drawing Figures

PROCESS AND APPARATUS FOR DIGITALLY CLAMPING PULSE CODE MODULATED VIDEO SIGNALS

BACKGROUND OF THE INVENTION

1. Field of the Invention

This invention generally relates to clamping circuits in which a recurring wave form is adjusted so as to have its mean or zero value maintained at a preselected level. The invention more specifically applies to systems for digitally clamping binary encoded signals, particularly pulse code modulated video signals, in which the clamping occurs during the horizontal blanking interval of the video signals.

2. Background of the Invention

It has already been proposed in co-pending U.S. application Ser. No. 808,702, filed June 21, 1977, now U.S. Pat. No. 4,124,869, to clamp a pulse code modulated video signal by determining a binary difference value between a predetermined nominal binary value, and the actual binary value of a pulse code modulated signal during the horizontal scanning interval of that signal. The difference value was to be added to the pulse code modulated video signal as a corrective value in the active range of the horizontal period. However, this process has the disadvantage that in those situations in which noise is superimposed over the pulse code modulated video signal, the interference results in alternating clamping level changes which rapidly occur, thereby causing a "lineation" of the clamped image signal.

It is, therefore, an object of the present invention to define a process and apparatus for digitally clamping pulse code modulated video signals which would avoid rapid changes in clamping level and thereby "time-average" the clamping effect on that signal. It is a further object of the present invention to provide various means and methods for digitally time-averaging clamping binary encoded signals, and thereby introducing a time constant which, in its effect, is similar to that found in analog clamping circuits.

SUMMARY OF THE INVENTION

In the clamping process of the present invention, a difference between a predetermined nominal binary value and the binary value of a binary encoded signal is determined by a digital subtracter means. The difference is then arithmetically averaged with at least one similarly determined difference obtained during a prior specified interval of the binary encoded signal, to obtain a binary correction value. The binary correction value is then added to the original binary encoded signal which is to be clamped by a digital adding means.

The arithmetic averaging process can consist simply of adding a single previously obtained correction value to a new different value and dividing the sum by two, the qoutient constituting the new binary correction value. In this simplest arrangement, the time constant is effectively only two periods in length.

In a more general application of the process, the prior obtained binary correction value is divided in the ratio of (n-1):n. This quotient is then added to the difference value which has been previously divided by the integer n where n is greater than one. This sum then constitutes the newly obtained binary correction value. It would be appreciated that where the integer n is selected to be two, this is fully equivalent with the prior process. Where n becomes the number larger than two, the time constant correspondingly increases.

Two other examples of preferred embodiments of the present invention are illustrated where the number of time periods over which the clamping effect takes place is variable depending upon the number of serially connected registers which are employed. Other features and advantages of the present invention will become apparent to those having ordinary skill in the are upon consideration of the following description of preferred embodiments of the invention taken in conjunction with the accompanying figures.

DESCRIPTION OF PREFERRED EMBODIMENTS

Figure 1:
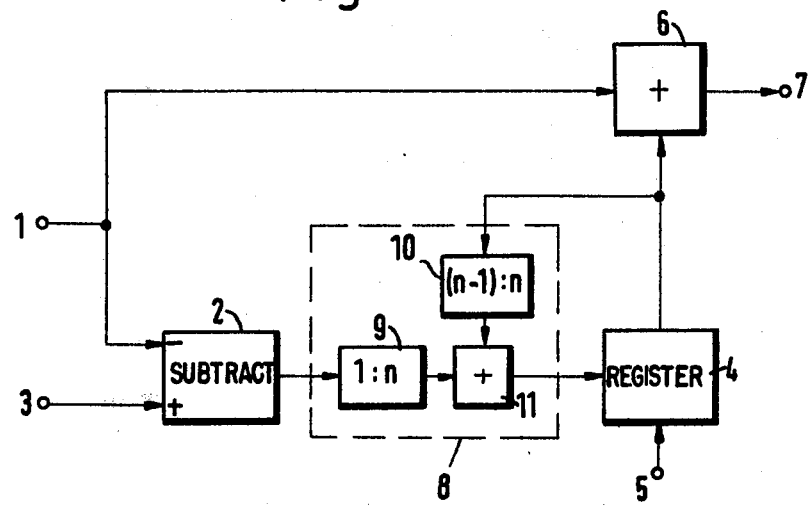
FIG. 1 is a block circuit diagram of one embodiment of the invention.

In the accompanying figures, the circuit groups with similar or identical functions are designated with the same reference numerals for simplicity of consideration. A digital clamping stage, as illustrated in any of FIGS. 1-4, can be employed for the reintroduction of a lost direct current reference in a pulse code modulated video signal. It is assumed that the direct current reference in the pulse code modulated video signal which is applied to terminal 1 has been lost due to a defective analog-digital converter process. For the elimination of the conversion defect, a difference value between the actual binary values of the pulse code modulated video signal which is applied to terminal 1 and a nominal binary value applied to terminal 3 is determined in a digital subtracter 2. In the same manner as that previously described in co-pending U.S. application Ser. No. 808,702, filed June 21, 1977, the binary difference value obtained at the output of subtracter 2 is transferred to the output of register 4 during the back porch of the horizontal blanking interval. The correct timing of the transfer in register 4 is carried out through the control of the horizontal frequency clamping impulse signal which is fed in at terminal 5.

By way of example, in the case of a $2^n$ bit binary coded video signal, register 4 can consist of n storage flip-flops. The transfer of the binary difference value which is applied to the input of such a register 4 during the back porch of the horizontal blanking interval permits the difference value to be stored for the duration of the subsequent horizontal period. The stored value is fed to an input of a digital adder 6 while the pulse code modulated video signal is fed to the other input of the digital adder. A clamped pulse code modulated video signal can then be taken from the sum output of the digital adder 6 at terminal 7.

Figure 2:
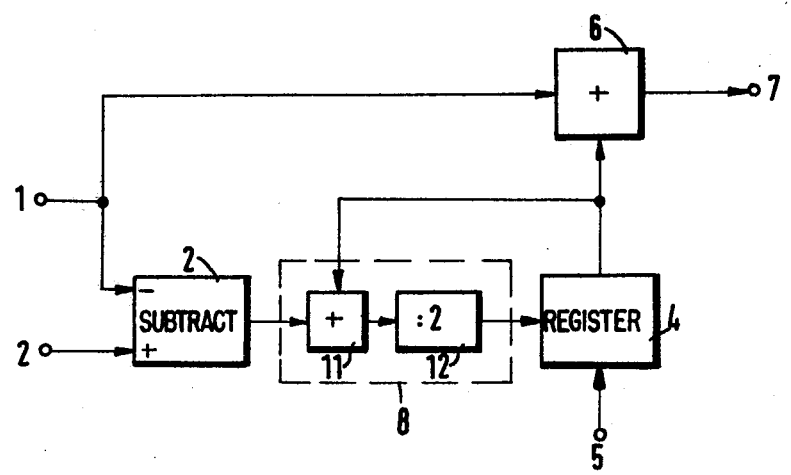
FIG. 2 is a block circuit diagram which can be considered a simplification of the first embodiment illustrated in FIG. 1.

The particular improvement of the present invention over that disclosed in co-pending U.S. application Ser. No. 808,702, filed June 21, 1977, is the incorporation of a time-averaging means including at least one register 4. As illustrated in FIGS. 1 and 2, the time averaging means can be considered to include register 4 and an arrangement 8 positioned between the output of subtracter 2 and the input of a register 4. As shown in FIG. 1, arrangement 8 contains two digital dividers 9 and 10 and a digital adder 11. One input of the digital adder 11 is connected with the output of subtracter 2 through digital divider 9 while the other input of digital adder 11 is connected with the output of register 4 through digital divider 10. The dividing ratios of the two digital dividers 9 and 10 are not equal. While the dividing ratio of digital divider 9 amounts to 1:n the dividing ratio of digital divider n amounts to (n−1):n where n is a positive integer greater than 1. The "time constant" effect of arrangement 8 increases as a larger integer n is selected.

If n is selected to be equal to two, the block circuit diagram illustrated in FIG. 1 can be simplified as illustrated in FIG. 2. In addition to the digital adder 11, arrangement 8 is now simplified such that it contains only a digital divider 12. In this case, the one input of the digital adder 11 is connected to theoutput of subtracter 2 while the other input of adder 11 is connected to the output of register 4. The binary value applied to the output of adder 11 is divided by two in the series-connected divider 12 and fed to the input of register 4. Since the previously determined binary correction value is applied to the output of register 4 and the present difference value to the output of subtracter 2, a repeated arithmetic averaging through the duration of a horizontal period is carried out by this embodiment.

By means of this invention, interferences in the pulse code modulated video signal which is to be clamped are continually decreased. By way of example, let it be assumed that the binary difference value determined by subtracter 2 is shifted from a constant value by the value $\Delta$ during a line m by noises super-imposed over the pulse code modulated video signal. During the lines following line m, let it be assumed that the binary difference value again returns to said constant value. With this assumption, different correcting values are fed to the digital adder 6, the correcting for each line amounting to the values shown in the following table:

Line $m = \frac{1}{2}(\Delta + 2 \text{ const.})$

Figure 3:
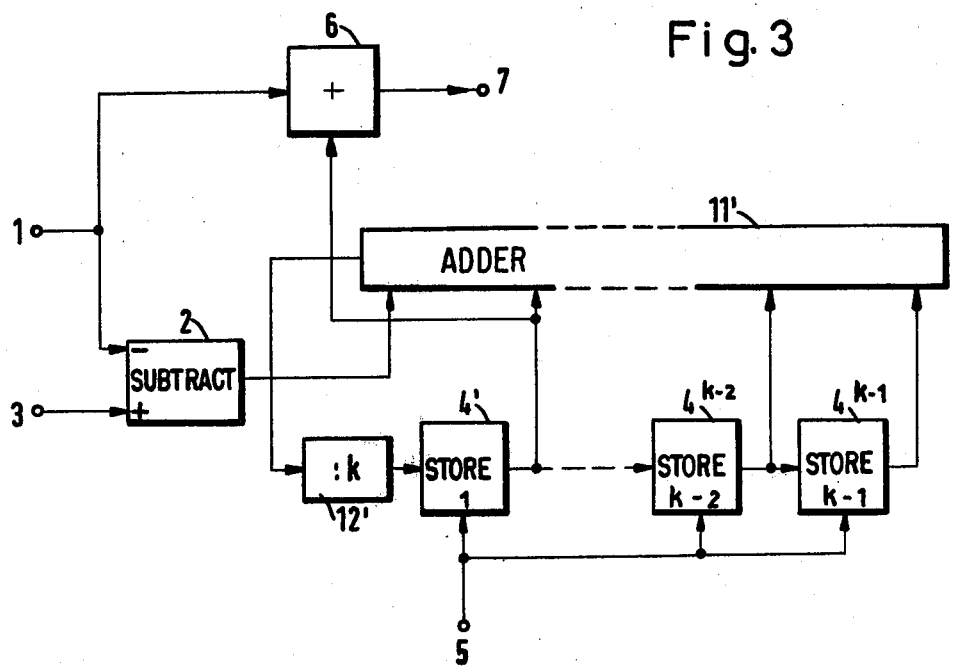
FIG. 3 is a block circuit diagram of another embodiment of the present invention.

Line $m+1 = \frac{1}{2}(\Delta/2 + 2 \text{ const.})$
ti Line $m+2 = \frac{1}{2}(\Delta/4 + 2 \text{ const.})$ Line $m+n = \frac{1}{2}(\Delta/2^n + 2 \text{ const.})$ In the block diagram illustrated in FIG. 3, another embodiment is provided in which the difference value, which is taken from the output of subtracter 2, is fed directly into adder 11'. The signal taken from the output of adder 11' is fed through a divider 12' to a series of $k-1$ registers 4' to $4^{k-1}$. The signals which can be taken from the outputs of registers 4' to $4^{k-1}$ are fed to other inputs of adder 11'. The output of each register 4' to $4^{k-2}$ connects with the input of the next succeeding register in the series. Thus, the time averaging effect relates directly to the number of registers employed in the series. In the case of $k-1$ series-connected registers, the divisor of the digital divider 12' amounts to the integer k while the binary corection value to be employed by the digital adder 6 appears at the output of register 4'.

Figure 4:
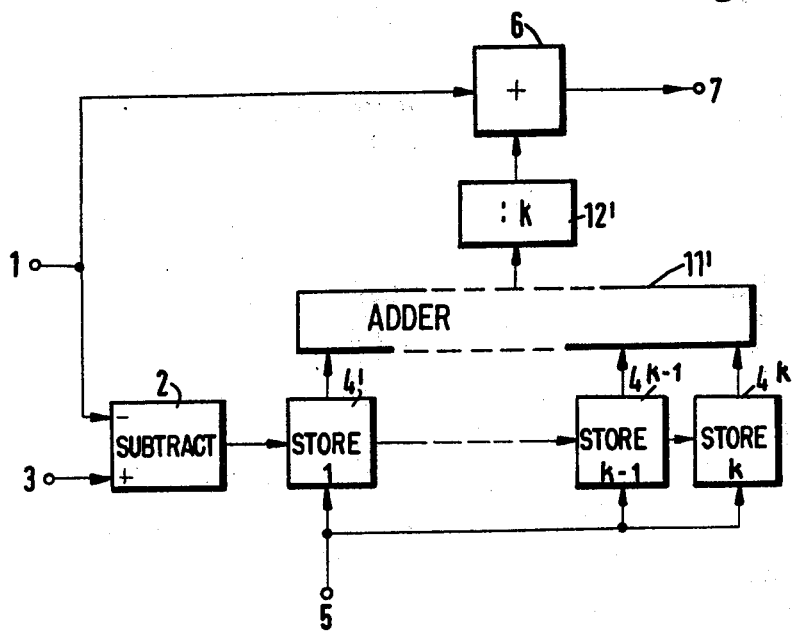
FIG. 4 is a block circuit diagram of yet another embodiment of the present invention.

In the block circuit diagram of the embodiment illustrated in FIG. 4, the difference values calculated by the digital subtracter 2 are arithmetically averaged through k horizontal periods by applying the value to k series-connected registers 4' through $4^k$. An output of each register 4' through $4^{k-1}$ is connected to the input of the next succeeding register in the series to permit transfer of the value in that register to the next register in the series upon receipt of the appropriate impulse signal at terminal 5: The outputs from the registers 4' through $4^k$ are connected to adder 11' and the output of adder 11' is divided by the integer k in a series connected digital divider 12', the quotient being fed to digital adder 6 as the binary correction value.

While several preferred embodiments have been disclosed in connection with the present invention, it is to be understood that various changes can be made in connection with the arrangement of the various substituent parts and in the detailed construction of the parts without departing from the spirit of the invention if they remain within the scope of the following claims.

I claim:

1. An apparatus for digitally time-average clamping binary encoded signals to a desired binary level comprising:
    (a) a digital subtracter means for providing at its output the difference between the desired binary level and the binary, encoded signal,
    (b) a time-averaging means, connected to the output of the subtracter means and responsive to a switching pulse input, for transferring to its output a binary correction value numerically equal to said difference arithmetically averaged with a similarly obtained difference from at least one prior-in-time binary encoded signal, and
    (c) digital adding means connected to the output of the time-averaging means for adding the binary correction value and the binary encoded signal, thereby providing at its output a digitally time-average clamped binary encoded signal.

2. The apparatus of claim 1 wherein the time-averaging means comprises a first digital divider connected to the output of the digital subtracter means for dividing said difference by a ratio of 1:n, a second digital divider connected to the output of the time-averaging means for dividing the output signal by a ratio of (n−1):n (where n is an integer greater than one), an adder for summing the outputs of the first and second digital divider, and a register means connected to the adder and responsive to said switching pulse input for transferring to the output of the time-averaging means the value present in the adder.

3. The apparatus of claim 1 wherein the time-averaging means comprises an adder connected to the output of said digital subtracter means and the output of said time-averaging means for summing the two values there present, a divider connected to the output of the adder for dividing the sum of said two values by 2, and a register means connected to the output of the divider and responsive to said switching pulse input for transferring to the output of the time-averaging means the value present in the divider.

4. The apparatus of claim 1 wherein the time-averaging means comprises an adder connected to the output of said digital subtracter means, a divider connected to the output of the adder for dividing the sum present in the adder by k (where k is an integer greater than 1), $k-1$ registers connected in series to the output of the divider and responsive to a switching pulse input for transferring to said adder the value input to each register, the output of the first register in the series being also connected to the output of the time-averaging means.

5. The apparatus of claim 1 wherein the time-averaging means comprises k registers (where k is an integer greater than 1) connected in series to the output of the subtracter means, an adder commonly connected to the outputs of the k registers for summing the values present in each register in response to a switching pulse input to the k registers, and a divider connected to the adder and the output of the time-averaging means for dividing the output of the adder by the integer k.

6. A process for digitally clamping a pulse code modulated video signal comprising the steps of
  (a) determining during each horizontal scanning interval the difference between the binary value of the pulse code modulated video signal and a predetermined nominal binary value,
  (b) arithmetically averaging said difference with at least one similarly determined difference obtained during a prior horizontal scanning interval to obtain a binary correction value, and
  (c) adding the binary correction value to the binary value of the pulse code modulated video signal which is to be clamped outside the horizontal scanning interval.

7. The process of claim 6 wherein the arithmetic averaging step comprises the steps of dividing the difference obtained in step (a) by an integer n (where n is greater than 1) and adding the quotient to the prior obtained binary correction value divided in the ratio of (n−1):n.

8. The process of claim 6 wherein the arithmetic averaging step comprises the steps of adding the difference obtained in step (a) to the binary correction value determined in the k−1 prior horizontal scanning intervals and dividing the sum by k where k is an integer greater than 1.

9. The process of claim 6 wherein the arithmetic averaging step comprises the steps of storing the difference value obtained in step (a) in a first of a series of k registers, each register other than the first receiving the value shifted from the prior register of the series, summing the difference values found in all k registers and dividing the sum by k (where k is an integer greater than 1) to obtain the binary correction value.

10. The process of claim 6 wherein the arithmetic averaging step comprises the steps of adding the previously obtained binary correction value to the difference value obtained in step (a), dividing the sum by 2 and storing the quotient in a register, the output of which is the binary correction value.

* * * * *